US012722413B2

(12) United States Patent
Moriguchi et al.

(10) Patent No.: US 12,722,413 B2
(45) Date of Patent: Sep. 1, 2026

(54) FIXING METHOD AND PRINTING APPARATUS

(71) Applicant: CANON KABUSHIKI KAISHA, Tokyo (JP)

(72) Inventors: Takuto Moriguchi, Kanagawa (JP); Osamu Yoshitake, Chiba (JP); Shin-Ichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 18/582,856

(22) Filed: Feb. 21, 2024

(65) Prior Publication Data

US 2024/0294026 A1 Sep. 5, 2024

(30) Foreign Application Priority Data

Mar. 1, 2023 (JP) ................................ 2023-031059
Dec. 20, 2023 (JP) ................................ 2023-214699

(51) Int. Cl.
*B41M 7/00* (2006.01)
*B41J 2/21* (2006.01)
*B41J 11/00* (2006.01)
*B41M 3/00* (2006.01)
*C09D 11/033* (2014.01)
*C09D 11/40* (2014.01)
*C09D 11/54* (2014.01)

(52) U.S. Cl.
CPC ................ *B41M 7/009* (2013.01); *B41J 2/21* (2013.01); *B41J 11/007* (2013.01); *B41J 11/0085* (2013.01); *B41M 3/001* (2013.01); *C09D 11/033* (2013.01); *C09D 11/40* (2013.01); *C09D 11/54* (2013.01)

(58) Field of Classification Search
CPC . B41M 7/009; B41M 3/001; B41J 2/21; B41J 11/007; B41J 11/0085; B41J 11/0015; B41J 11/0022; B41J 11/0024; C09D 11/033; C09D 11/40; C09D 11/54; C09D 11/322
USPC .......................................................... 347/102
See application file for complete search history.

(56) References Cited

U.S. PATENT DOCUMENTS 9,527,314 B2 12/2016 Moriguchi et al.
10,479,124 B2 11/2019 Moriguchi et al.
2003/0156177 A1* 8/2003 Nishikawa ........... B41J 11/0045 347/102

(Continued)

FOREIGN PATENT DOCUMENTS

JP 2017-52176 A 3/2017
JP 2018-202870 A 12/2018

OTHER PUBLICATIONS

Moriguchi et al., U.S. Appl. No. 18/636,414, filed Apr. 16, 2024.

(Continued)

*Primary Examiner* — Jason S Uhlenhake
*Assistant Examiner* — Alexander D Shenderov
(74) *Attorney, Agent, or Firm* — Venable LLP

(57) ABSTRACT

An object is to provide a method of appropriately drying a print medium. A fixing method includes: applying ink to the print medium; cooling the print medium to which the ink is applied in the applying; and heating the print medium cooled in the cooling while maintaining the print medium in a flat and smooth state.

14 Claims, 3 Drawing Sheets

(56) References Cited

U.S. PATENT DOCUMENTS

| | | | | |
|---|---|---|---|---|
| 2010/0075052 | A1* | 3/2010 | Irita | C09D 11/54 524/321 |
| 2015/0103113 | A1* | 4/2015 | Monclus | B41M 5/0011 347/16 |
| 2018/0029385 | A1 | 2/2018 | Mataki | |
| 2018/0117932 | A1 | 5/2018 | La Vos et al. | |
| 2019/0152247 | A1* | 5/2019 | Shinohara | D06P 1/673 |
| 2021/0129567 | A1 | 5/2021 | Seguchi et al. | |

OTHER PUBLICATIONS

Extended European Search Report in European Application No. 24159347.4 (Jul. 2024).

* cited by examiner

FIXING METHOD AND PRINTING APPARATUS

BACKGROUND

Field of the Invention

The present disclosure relates to a fixing method and a printing apparatus.

Description of the Related Art

In a printing method in which an image is formed by applying ink to a print medium to perform printing, a solvent included in the ink is desired to permeate into the print medium irrespective of an ink absorbing performance of the print medium to obtain good fastness of the image.

In such a situation, Japanese Patent Laid-Open No. 2017-52176 discloses an ejection apparatus (also referred to as printing apparatus) that causes ink droplets to permeate into a print medium by causing the print medium to which the ink drops are ejected to pass through a space of a high-humidity environment.

Japanese Patent Laid-Open No. 2018-202870 discloses a printing method in which ink is applied to a print medium with low ink absorbing performance, then a water content included in the ink is made to evaporate to a certain level, and thereafter the remaining water content and a solvent with a higher vapor pressure than the water content are made to evaporate to dry the print medium.

However, in the ejection apparatus of Japanese Patent Laid-Open No. 2017-52176, the print medium passes through the high-humidity space moisturized to a higher humidity than a periphery of the apparatus. Accordingly, there is a possibility that the print medium excessively absorbs moisture, and cockling occurs.

Moreover, in the printing method of Japanese Patent Laid-Open No. 2018-202870, the temperature is increased immediately after the application of the ink to dry the print medium. Accordingly, the water content in the ink evaporates before the solvent in the ink, and the solvent thereby remains on the surface of the print medium. In this case, the solvent cannot permeate into the print medium, and there is a possibility that good fastness of image cannot be obtained.

SUMMARY

Thus, an object of the present disclosure is to provide a method of appropriately drying the print medium.

A fixing method of ink to a print medium, including: applying the ink to a first surface of the print medium with a liquid application unit; cooling the print medium to which the ink is applied in the applying, to temperature equal to or below temperature of liquid applied in the applying, by blowing air to the print medium; and heating the print medium cooled in the cooling while maintaining the print medium in a flat and smooth state.

Further features of the present invention will become apparent from the following description of exemplary embodiments with reference to the attached drawings.

DESCRIPTION OF THE EMBODIMENTS

First Embodiment

A technique of the present disclosure is described below in detail by giving a preferable embodiment. Note that the embodiment described below is the preferable embodiment of the present disclosure. Accordingly, various technically-preferable limitations are added. However, the scope of the present disclosure is not unreasonably limited by the following description. Furthermore, not all of configurations described in the present embodiment are constituent features essential to the present disclosure.

A printing apparatus according to the embodiment of the present disclosure is described below with reference to the drawings.

Figure 1:
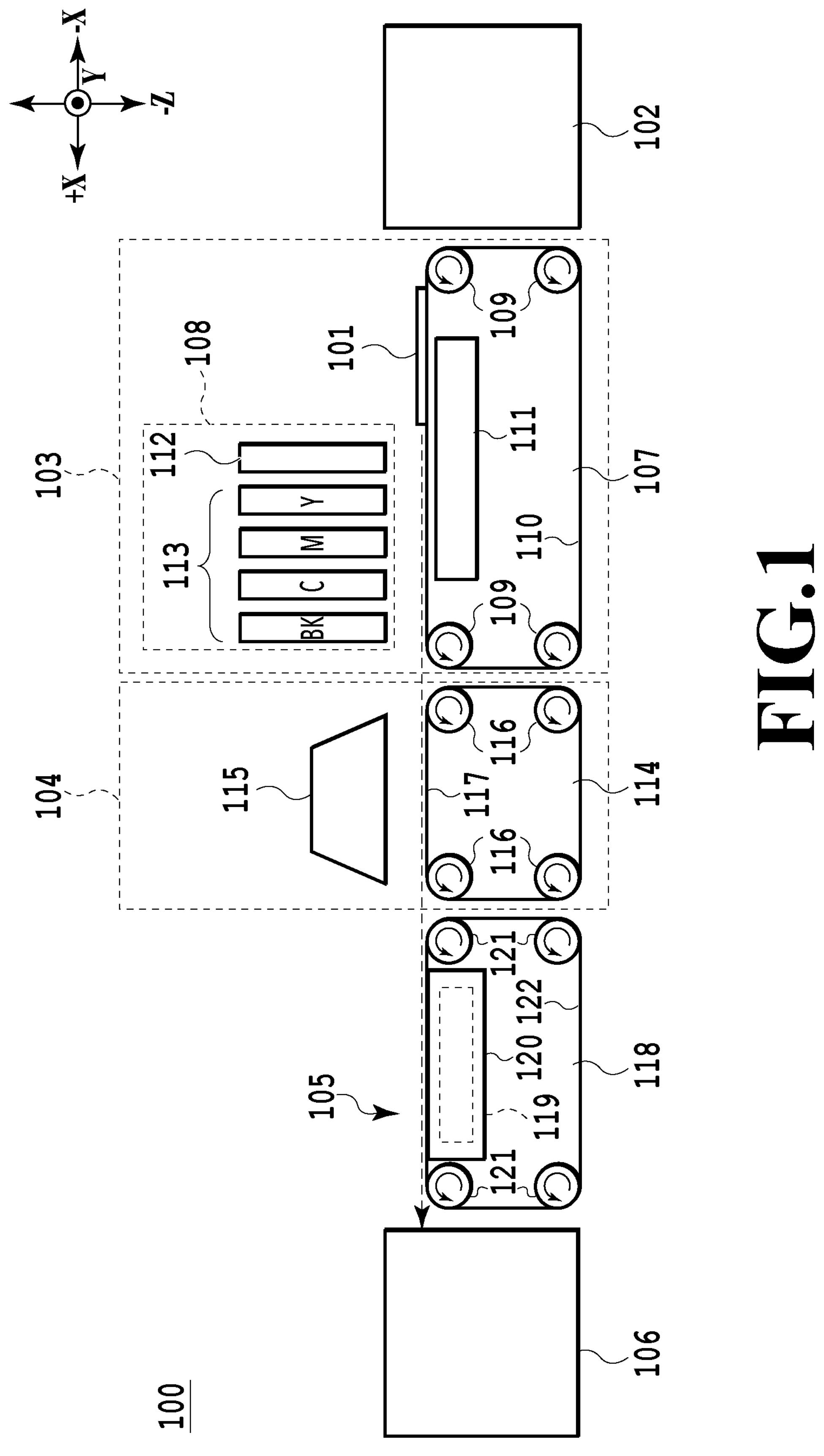
FIG. 1 is a schematic diagram illustrating a configuration example of a printing apparatus in one embodiment.

FIG. 1 is a schematic diagram illustrating a configuration example of the printing apparatus 100.

FIG. 1 illustrates three arrows of an arrow X, an arrow Y, and an arrow Z that orthogonally intersect one another. In the present embodiment, the X direction, the Y direction, and the Z direction indicate the width direction (overall length direction), the depth direction, and the height direction of the printing apparatus 100, respectively. A +X direction in the X direction indicates a conveyance direction of a print medium 101. A −X direction indicates the opposite direction to the +X direction. A +Z direction in the Z direction indicates an upward direction. A −Z direction indicates a downward direction. Moreover, a surface of the print medium 101 facing in the +Z direction is referred to as "upper surface", and a surface of the print medium 101 facing in the −Z direction is referred to as "lower surface".

In FIG. 1, arrows illustrated inside first rotating shafts 109, second rotating shafts 116, and third rotating shafts 121 indicate rotating directions of the respective rotating shafts. An arrow illustrated by a broken line indicates a conveyance path of the print medium 101.

<Print Medium>

In the present embodiment, the print medium 101 is not limited to a particular print medium as long as the print medium is capable of receiving a reaction liquid and ink. A publicly-known print medium can be used as the print medium 101. Examples of the publicly-known print medium include a long print medium wound into a roll shape or a leaflet print medium cut into predetermined dimensions. Examples of a material of the print medium 101 include paper, plastic film, wooden board, cardboard paper, metal film, and the like.

<Printing Apparatus 100>

As illustrated in FIG. 1, the printing apparatus 100 includes a paper feed unit 102, an image forming unit 103, a cooling unit 104, a heating unit 105, and a paper discharge unit 106.

<Paper Feed Unit 102>

The paper feed unit 102 is configured to be capable of feeding the print medium 101 to the image forming unit 103.

<Image Forming Unit 103>

The image forming unit 103 includes a first conveyance mechanism 107 capable of conveying the print medium 101 to the cooling unit 104 and an image forming mechanism 108 capable of forming an image on the print medium 101.

<First Conveyance Mechanism 107>

The first conveyance mechanism 107 includes four first rotating shafts 109 that extend in the Y direction and that are arranged in the X direction and a first belt 110 that is wound to be rotatable with rotation of the rotating shafts. In the example illustrated in FIG. 1, the first rotating shafts 109 rotate counterclockwise to rotate the first belt 110 counterclockwise. The print medium 101 is thereby conveyed in the +X direction in the example illustrated in FIG. 1. Examples of materials included in the first belt 110 include a resin, a metal, and the like. Many holes are opened in the first belt 110. Furthermore, the first conveyance mechanism 107 includes a first fixing mechanism 111 that is arranged below the print medium 101 on the first belt 110 and that can fix the print medium 101 on the first belt 110.

The print medium 101 fed from the paper feed unit 102 is conveyed by the first conveyance mechanism 107, and passes below the image forming mechanism 108.

An example of the first fixing mechanism 111 includes a suction pump capable of generating negative pressure. Activating the suction pump allows the print medium 101 on the first belt 110 to be fixed while being sucked through holes opened in the first belt 110.

<Image Forming Mechanism 108>

The image forming mechanism 108 includes a reaction liquid application mechanism 112 capable of applying the reaction liquid that reacts with the ink to the print medium 101 and an ink application mechanism 113 capable of applying the ink to the print medium 101.

<Reaction Liquid Application Mechanism 112>

The reaction liquid application mechanism 112 is configured to be capable of applying the reaction liquid to the print medium 101. The reaction liquid application mechanism 112 may be any mechanism as long as the mechanism can apply the reaction liquid onto the print medium 101. Various conventionally-known mechanisms can be used as the reaction liquid application mechanism 112 as appropriate.

Specific examples of the reaction liquid application mechanism 112 include a gravure offset roller, an inkjet head, a die coating device (die coater), a blade coating device (blade coater), and the like.

The application of the reaction liquid by the reaction liquid application mechanism 112 may be performed before the application of the ink by the ink application mechanism 113 or after the application of the ink as long as the reaction liquid can mix (react) with the ink on the print medium 101. Applying the reaction liquid before the application of the ink is more preferable. This is because applying the reaction liquid before the application of the ink can suppress bleeding and beading.

Note that the bleeding refers to a phenomenon in which different types of inks applied adjacent to each other in image formation of an inkjet method mix with each other and boundaries in an image become unclear. The beading refers to a phenomenon in which an ink applied first in the image formation of the inkjet method is attracted toward a subsequently-applied ink and variation in density becomes visible in a same image.

<Reaction Liquid>

The reaction liquid used in the present embodiment can reduce flowability of the ink and/or some of ink compositions on the print medium 101 by coming into contact with the ink. Specifically, a reactant (component that increases the viscosity of the ink) included in the reaction liquid comes into contact with a coloring material, a resin, or the like that are some of the compositions forming the ink to chemically react with the compositions or to physically adsorb to the compositions. This increases the viscosity in the ink as a whole or causes a local increase in viscosity due to aggregation of some of components forming the ink such as the coloring material. Increasing the viscosity can reduce the flowability of the ink and/or some of the ink compositions. Reducing the flowability can suppress the bleeding and the beading.

Components forming the reaction liquid applied to the present embodiment are described below in detail.

<Reactant>

The reaction liquid is a liquid that causes a component with an anionic group (resin, self-dispersible pigment, or the like) in the ink to aggregate by coming into contact with the ink, and contains the reactant. Examples of the reactant include multivalent metal ions, cationic components such as cationic resins, organic acids, and the like.

Examples of the multivalent metal ions include bivalent metal ions such as $Ca^{2+}$, $Cu^{2+}$, $Ni^{2+}$, $Mg^{2+}$, $Sr^{2+}$, $Ba^{2+}$, and $Zn^{2+}$ and trivalent metal ions such as $Fe^{3+}$, $Cr^{3+}$, $Y^{3+}$, and $Al^{3+}$.

A multivalent metal salt (may be a hydrate) formed by bonding of a multivalent metal ion and an anion may be used to include the multivalent metal ion in the reaction liquid. Examples of the anion include inorganic anions such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$, and $H_2PO_4^-$. Other examples of the anion include organic anions such as $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, and $CH_3SO_3^-$.

In the case where the multivalent metal ion is used as the reactant, the content (mass %) thereof in the reaction liquid in multivalent metal salt equivalent is preferably 1.00 mass % to 40.00 mass % based on the total mass of the reaction liquid. The reaction liquid containing the organic acid is a liquid that has a buffering capacity in an acidic range (below pH 7.0, preferably pH 2.0 to pH 5.0) to turn the anionic group in the component present in the ink to an acid type and cause the component to aggregate.

Examples of the organic acid include the following acids. The examples include monocarboxylic acids such as formic acid, acetic acid, propionic acid, butyric acid, benzoic acid, glycolic acid, lactic acid, salicylic acid, pyrrole carboxylic acid, furancarboxylic acid, picolinic acid, nicotinic acid, thiophenecarboxylic acid, levulinic acid, and coumalic acid and salts of these acids. Moreover, the examples include dicarboxylic acids such as oxalic acid, malonic acid, succinic acid, glutaric acid, adipic acid, maleic acid, fumaric acid, itaconic acid, sebacic acid, phthalic acid, malic acid, tartaric acid, salts and hydrogen salts of these acids, and the like. Furthermore, the examples include tricarboxylic acids such as citric acid and trimellitic acid, salts and hydrogen salts of these acids, tetracarboxylic acids such as pyromellitic acid, salts and hydrogen salts of these acids, and the like. The content (mass %) of the organic acid in the reaction liquid is preferably 1.00 mass % to 50.00 mass %.

Examples of the cationic resin include resins with structures of primary to tertiary amines, resins with structures of quaternary ammonium salts, and the like. Specific examples of the cationic resin include resins with structures of vinylamine, allylamine, vinylimidazole, vinylpyridine, dimethylaminoethyl methacrylate, ethyleneimine, guanidine, and the like.

The cationic resin may be used together with an acid compound or subjected to quaternization to improve solubility in the reaction liquid. In the case where the cationic resin is used as the reactant, the content (mass %) of the cationic resin in the reaction liquid is preferably 1.00 mass % to 10.00 mass % based on the total mass of the reaction liquid.

<Components Other Than Reactant>

An aqueous medium, other additives, and the like similar to those described above as components usable in the ink can be used as components other than the reactant.

<Ink Application Mechanism 113>

The reaction liquid and the ink are mixed on the print medium 101 to form an image. In the present embodiment, an inkjet head is used as the ink application mechanism 113. Examples of a form of the inkjet head include a form in which electrothermal converters cause film boiling in the ink and form air bubbles to eject the ink, a form in which electromechanical converters eject the ink, a form in which the ink is ejected by means of static electricity, and the like.

The inkjet head using the electrothermal converters is preferable among the inkjet heads particularly from the viewpoint of performing high density printing at high speed. The inkjet head draws an image by receiving an image signal and applying a necessary amount of ink to each position.

The inkjet head in the present embodiment is a full line head extending in the Y direction. Nozzles are arranged in such a range that the nozzles can cover the width (length in the Y direction) of an image formation region of the print medium 101 having the maximum size usable in the printing apparatus. The inkjet head has an ink ejection surface on which the nozzles are opened, on the lower surface (surface facing in the −Z direction). The ink ejection surface faces the front surface (surface facing in the +Z direction) of the print medium 101 with a fine gap of about several millimeters provided therebetween.

An ink application amount can be expressed by a density value in image data, an ink thickness, or the like. In the present embodiment, an average value obtained by multiplying a mass of each ink dot by the number of applied ink dots and dividing the resultant value by an area of an applied region is used as the ink application amount ($g/m^2$). Note that a maximum ink application amount in the image formation region means an ink application amount of the ink applied to an area of at least 1 $mm^2$ or more in a region used as information of an ejection target medium, from the viewpoint of removing a liquid component in the ink.

As illustrated in FIG. 1, the ink application mechanism 113 may include multiple inkjet heads to apply multiple types of inks to the print medium 101. For example, in the case where color images are formed by using a yellow ink, a magenta ink, a cyan ink, and a black ink, the ink application mechanism 113 include four inkjet heads that eject the above-mentioned four inks, respectively, to the print medium 101. These inkjet heads are arranged to be aligned in the X direction. In the example illustrated in FIG. 1, the inkjet heads are arranged in the order of yellow (Y), magenta (M), cyan (C), and black (BK) in the +X direction. Note that the ink application mechanism 113 may be a mechanism including an inkjet head that applies an ink of only one of the above-mentioned colors.

<Ink>

Components forming the ink applied to the present embodiment are described below in detail.

<Coloring Material>

A pigment or a dye can be used as the coloring material. The content of the coloring material in the ink is preferably 0.5 mass % to 15.0 mass % based on the total mass of the ink. More preferably, the content is 1.0 mass % to 10.0 mass %. Specific examples of the pigment include inorganic pigments such as carbon black and titanium oxide and organic pigments such as azo, phthalocyanine, quinacridone, isoindolinone, imidazolone, diketopyrrolopyrrole, and dioxazine.

A resin-dispersed pigment using a resin as a dispersant, a self-dispersible resin in which a hydrophilic group is bonded to a surface of a pigment particle, or the like can be used as a dispersion method of the pigment. Moreover, a resin bonding type pigment in which an organic group including a resin is chemically bonded to a surface of a pigment particle, a micro-capsule pigment in which a surface of a pigment particle is covered with a resin or the like, or similar pigments may be used.

A resin dispersant capable of dispersing the pigment in an aqueous medium by an action of an anionic group is preferably used as the resin dispersant for dispersing the pigment in the aqueous medium. Resins described below can be preferably used as the resin dispersant. More preferably, a water-soluble resin can be used. The content (mass %) of the pigment is preferably 0.3 to 10.0 times the content of the resin dispersant in terms of mass ratio (pigment/resin dispersant).

A pigment in which an anionic group such as carboxylic acid group, sulphonic acid group, or phosphonic acid group is bonded directly to a surface of a pigment particle or via another atom group (—R—) can be used as the self-dispersible pigment. The anionic group may be an acid type or a salt type. In the case where the anionic group is the salt type, the anionic group may be in a partially dissociated state or a completely dissociated state. Examples of a cation to be a counter ion in the case where the anionic group is the salt type include alkali metal cations, ammonium, organic ammonium, and the like.

Moreover, specific examples of the other atom group (—R—) include a linear or branched alkylene group with 1 to 12 carbon atoms, an arylene group such as phenylene group and naphthylene group, carbonyl group, imino group, amide group, sulfonyl group, ester group, ether group, and the like. A group obtained by combing the above groups may be used.

The dye preferably includes an anionic group. Specific examples of the dye include azo, triphenylmethane, (aza) pthalocyanine, xanthene, anthrapyridone, and the like.

<Resin>

The ink may include a resin. The content (mass %) of the resin in the ink is preferably 0.1 mass % to 25.0 mass % based on the total mass of the ink. More preferably, the content is 10.0 mass % to 20.0 mass %.

The following two reasons can be given as examples of reasons why the resin is added to the ink.

(i) The resin is added to stabilize the dispersion state of the pigment (specifically, to be used as the above-mentioned resin dispersant or to assist the resin dispersant).

(ii) The resin is added to improve various characteristics of the image formed on the print medium 101.

Examples of a form of the resin include block copolymer, random copolymer, graft copolymer, a combination of these copolymers, and the like.

Moreover, the resin may be in a state where the resin is dissolved in the aqueous medium as a water-soluble resin or in a state where the resin is dispersed in the aqueous medium as a resin particle. The resin particle does not have to contain the coloring material.

In the present disclosure, the resin being water soluble means that no particle whose particle size can be measured by dynamic light scattering is formed in the case where the resin is neutralized by using an alkaline equivalent to the acid value. Whether the resin is water soluble or not can be determined according to the method described below.

First, a liquid (resin solid content: 10% by mass) containing the resin neutralized by an alkaline (sodium hydroxide, potassium hydroxide, or the like) corresponding to the acid value is prepared. Next, a specimen solution is prepared by diluting the prepared liquid 10 times (based on volume) with pure water. Then, in the case where no particle with a particle size is measured in measurement of the particle size of the resin in the specimen solution by dynamic light scattering, it is possible to determine that the resin is water-soluble.

For example, measurement conditions in this case can be set such that Set Zero is 30 seconds, the number of times of measurement is three times, and measurement time is 180 seconds.

A particle size analyzer (for example, trade name "UPA-EX150" manufactured by Nikkiso Co., Ltd.) using dynamic light scattering or the like can be used as a particle size distribution measurement apparatus. As a matter of course, the particle size distribution measurement apparatus, the measurement conditions, and the like to be used are not limited to the examples described above.

The acid value of the resin is preferably 100 mgKOH/g to 250 mgKOH/g in the case of the water-soluble resin. More preferably, the acid value is 5 mgKOH/g to 100 mgKOH/g in the case of the resin particle.

The weight average molecular weight of the resin is preferably 3,000 to 15,000 in the case of the water-soluble resin. More preferably, the weight average molecular weight is 1,000 to 2,000,000 in the case of the resin particle. The volume average particle size of the resin particle measured by the dynamic light scattering (measurement conditions are the same as those in the above example) is preferably 100 nm to 500 nm. Examples of the resin include an acrylic resin, a urethane resin, an olefin resin, and the like. Among these resins, the acrylic resin and the urethane resin are preferable.

The acrylic resin preferably includes a hydrophilic unit and a hydrophobic unit as structural units. A resin including, among such units, a hydrophilic unit derived from (meth) acrylic acid and a hydrophobic unit derived from at least one of a monomer with an aromatic ring and a (meth)acrylic ester-based monomer is preferable. Particularly, a resin including a hydrophilic unit derived from (meth)acrylic acid and a hydrophobic unit derived from a monomer of at least one of styrene and α-methylstyrene is preferable. Since these resins tend to interact with the pigment, these resins can be preferably used as the resin dispersant for dispersing the pigment.

The hydrophilic unit is a unit having a hydrophilic group such as an anionic group. The hydrophilic unit can be formed by, for example, polymerizing a hydrophilic monomer having the hydrophilic group. Specific examples of the hydrophilic monomer having the hydrophilic group include acidic monomers having a carboxylic group such as (meth) acrylic acid, itaconic acid, maleic acid, and fumaric acid, anionic monomers such as anhydrates, salts, and the like of these acidic monomers, and the like. Examples of cations that form salts with the acidic monomers include ions of lithium, sodium, potassium, ammonium, organic ammonium, and the like.

The hydrophobic unit is a unit having no hydrophilic group such as the anionic group. The hydrophobic unit can be formed by, for example, polymerizing a hydrophobic monomer having no hydrophilic group such as the anionic group. Specific examples of the hydrophobic monomer include monomers having an aromatic ring such as styrene, α-methylstyrene, and (meth)acrylic acid benzyl and the like. Other examples include (meth)acrylic acid ester based monomers such as (meth)acrylic acid methyl, (meth)acrylic acid butyl, and (meth)acrylic acid.2-ethylhexyl and the like.

The urethane resin can be obtained by, for example, causing polyisocyanate and polyol to react with each other. Moreover, the polyisocyanate and polyol may be made to further react with a chain extender. Examples of the olefin resin include polyethylene, polypropylene, and the like.

<Aqueous Medium>

The ink may contain an aqueous medium that is water or a mixed solvent of water and a water-soluble organic solvent. Deionized water or ion-exchanged water is preferably used as water. The content (mass %) of water in the aqueous ink is preferably 50.0 mass % to 95.0 mass % based on the total mass of the ink.

Moreover, the content (mass %) of the water-soluble organic solvent in the aqueous ink is preferably 3.0 mass % to 50.0 mass % based on the total mass of the ink. Preferably, the water-soluble organic solvent can be used in an ink for inkjet, and has a boiling point equal to or higher than the boiling point (100° C.) of water. More preferably, the boiling point of the water-soluble organic solvent is 120° C. or higher. Examples of the water-soluble organic solvent include (poly)alkylene glycols, glycol ethers, nitrogen-containing compounds, sulfur-containing compounds, and the like.

<Wax>

In a strict chemical meaning, wax means an ester of an aliphatic acid and a higher monohydric or dihydric alcohol that is insoluble to water. However, in the present embodiment, wax means as follows in a broader sense. A type of wax usable in the present embodiment is not limited to a particular type of wax.

Specific examples of the wax usable in the present embodiment include natural waxes such as beeswax, lanolin, carnauba wax, candelilla wax, and montan wax. Other examples include petroleum waxes such as paraffin wax and microcrystalline wax. Other examples include synthetic waxes such as Fischer-Tropsch wax, polyethylene wax, polypropylene wax, and oxidized wax. Other examples include modified waxes such as urethane-modified wax. Other examples include α-olefin-maleic anhydride copolymer wax and the like. The aforementioned waxes may be used alone or in a combination of two or more types as necessary.

<Other Additives>

The ink may contain various additives such as defoaming agent, surfactant, pH adjuster, viscosity adjuster, antirust agent, antiseptic, fungicide, oxidation inhibitor, and reduction inhibitor as necessary in addition to the components described above.

In the case where an image formation step of the present embodiment is completed, the print medium 101 is conveyed from the image forming unit 103 to the cooling unit 104.

<Cooling Unit 104>

The cooling unit 104 is configured to be capable of cooling the print medium 101 on which the image is formed, while conveying the print medium 101. The cooling in the cooling unit 104 may be performed by temporarily stopping the conveyance.

The cooling unit 104 includes a second conveyance mechanism 114 capable of conveying the print medium 101 conveyed from the first conveyance mechanism 107 to the heating unit 105 and a cooling mechanism 115 capable of cooling the print medium 101 on the second conveyance mechanism 114.

<Second Conveyance Mechanism 114>

The second conveyance mechanism 114 includes four second rotating shafts 116 that extend in the Y direction and that are arranged in the X direction and a second belt 117 that is wound to be rotatable with rotation of the rotating shafts. The second conveyance mechanism 114 is arranged downstream of the first conveyance mechanism 107 in the +X direction. Examples of materials included in the second belt 117 include a resin, a metal, and the like.

The second conveyance mechanism 114 does not have to include a fixing mechanism (for example, a suction pump) for fixing the print medium 101. The reason for this is as follows. For example, assume that the print medium 101 is in a state where it is laid across the first conveyance mechanism 107 and the second conveyance mechanism 114. In this state, the image forming mechanism 108 may still be forming an image on the print medium 101. If a suction pump of the second conveyance mechanism 114 sucks the print medium 101 at excessively large force despite the image formation, the print medium 101 is misaligned on the first conveyance mechanism 107 in some cases.

Moreover, the length of the second conveyance mechanism 114 in the X direction is preferably larger than the length of the print medium 101 in the X direction. The reason for this is as follows. For example, assume that the print medium 101 in the middle of conveyance is conveyed in a state where the print medium 101 is laid across the second conveyance mechanism 114 and a third conveyance mechanism 118 to be described later. In this case, if the length of the print medium 101 in the X direction is smaller than the length of the second conveyance mechanism 114 in the X direction, no print medium 101 is present on the first conveyance mechanism 107. Specifically, making the length of the second conveyance mechanism 114 in the X direction larger than the length, in the X direction, of the print medium 101 assumed to be conveyed can reduce the possibility of the print medium 101 misaligned in the image formation.

<Cooling Mechanism 115>

The cooling mechanism 115 is configured to be capable cooling the reaction liquid and ink applied to the print medium 101. The cooling mechanism 115 may be any mechanism as long as it can cool the print medium 101. For example, various conventionally-known mechanisms can be used as appropriate. Cooling the print medium 101 increases the viscosities of the reaction liquid and the ink on the surface of the print medium 101. Increasing the viscosities of the reaction liquid and the ink suppresses permeation of the reaction liquid and the ink into the print medium 101.

In the present embodiment, the print medium 101 is cooled during the conveyance of the print medium 101 to suppress permeation of the reaction liquid and the ink, and this suppresses cockling while suppressing the bleeding and the beading described above.

Meanwhile, the surface of the print medium 101 to which the ink is applied may not be sufficiently dried yet. Accordingly, it is preferable that the cooling mechanism 115 can cool the print medium 101 without coming into contact with the surface of the print medium 101 to which the ink is applied.

An air blower can be given as a preferable example of the cooling mechanism 115. An example of a cooling method using the air blower include a method in which air outside the cooling mechanism 115 or air cooled by an air cooler or the like is blown to the print medium 101 with a blower or the like. Temperature of air blown to the print medium 101 is preferably equal to or lower than temperature of the ink applied to the print medium 101 by the ink application mechanism 113.

Moreover, in the case where the cooling is performed, it is preferable to cool the surface (upper surface in the example of FIG. 1) of the print medium 101 to which the reaction liquid and the ink are applied, before the surface (lower surface in the example of FIG. 1) of the print medium 101 to which no reaction liquid or ink is applied. Cooling the upper surface of the print medium 101 before the lower surface allows the reaction liquid and the ink to be cooled in shorter time than in the case where the lower surface is cooled before the upper surface. Specifically, cooling the upper surface of the print medium 101 before the lower surface can increase the viscosities of the reaction liquid and the ink in shorter time than in the case where the lower surface is cooled before the upper surface.

Note that the lower surface of the print medium 101 may be cooled before the upper surface as long as the print medium 101 can be cooled. Furthermore, both surfaces of the print medium 101 may be cooled simultaneously as long as the print medium 101 can be cooled.

In the cooling unit 104, the ink on the print medium 101 is preferably cooled such that the viscosity thereof is increased to 3 cps or more. More preferably, the ink is cooled such that the viscosity thereof becomes 5 cps or more.

In the case where the cooling of the print medium 101 is completed, the print medium 101 is conveyed from the cooling unit 104 to the heating unit 105.

<Heating Unit 105>

The heating unit 105 is configured to be capable of drying the print medium 101 while fixing the print medium 101 and conveying the print medium 101 to the paper discharge unit 106. The heating unit 105 includes the third conveyance mechanism 118 capable of conveying the print medium 101 to the paper discharge unit 106, a second fixing mechanism 119 capable of fixing the print medium 101 while maintaining the print medium 101 in a flat and smooth state, and a heating mechanism 120 capable of heating the print medium 101.

<Third Conveyance Mechanism 118>

The third conveyance mechanism 118 includes four third rotating shafts 121 that extends in the Y direction and that are arranged in the X direction and a third belt 122 wound to be rotatable with rotation of the rotating shafts. Examples of materials included in the third belt 122 include a resin, a metal, and the like.

As a method of fixing the print medium 101, many holes may be opened in the third belt 122 in the case where a suction pump is used. The print medium 101 can be thereby fixed by using the suction pump arranged below the print medium 101 on the third belt 122.

<Second Fixing Mechanism 119>

The second fixing mechanism 119 may be any mechanism as long as the mechanism can fix the print medium 101 in a posture in which the flatness and smoothness of the print medium 101 are maintained while the print medium 101 is heated. Various conventionally-known mechanisms can be used as the second fixing mechanism 119 as appropriate. A method of fixing the print medium 101 is preferably suction fixation, adhering fixation, or the like. Among these fixing methods, the suction fixation by the suction pump is preferable in terms of cost and energy efficiency.

For example, in the case where the suction pump is used, the suction pump is arranged below the third belt 122 in which many holes are opened. Then, the suction pump is activated to generate negative pressure, and the print medium 101 on the third belt 122 can be thereby sucked through the holes opened in the third belt 122 and fixed. Suction pressure of the suction pump is preferably −0.3 kPa or more and −50 kPa or less to suppress cockling of the print medium 101 in the state where the ink is applied thereto and to maintain the flatness and smoothness of the print medium 101. More preferably, the suction pressure is −1 kPa or more and −5 kPa or less.

<Heating Mechanism 120>

The heating mechanism 120 is configured to be capable of heating and drying the print medium 101. Heating the print medium 101 reduces the viscosities of the liquid components in the reaction liquid and the ink. Reducing the viscosities of the liquid components in the reaction liquid and ink facilitates permeation of the liquid components in the applied reaction liquid and ink into the print medium 101.

Heating the print medium 101 causes the solvent in the ink applied to the print medium 101 to evaporate, and reduces an amount of the solvent permeating into the print medium 101. The fastness of the image is thereby improved from that in the case where the solvent does not permeate into the print medium 101. As described above, fixing the print medium 101 in the heating of the print medium 101 can suppress cockling.

The heating mechanism 120 may be any mechanism as long as the mechanism can heat the print medium 101. For example, various conventionally-known mechanisms can be used as appropriate. Preferable examples of the heating mechanism 120 include a hot air dryer, a heater, and the like. The type of heater is also not limited to a particular type. Any heater can be selected as appropriate from among publicly-known heaters, and applied. Among the heaters, a heating wire or an infrared heater is preferable in consideration of safety, energy efficiency, and the like.

Moreover, in the case where the heating is performed, it is preferable to heat the surface (lower surface in the example of FIG. 1) of the print medium 101 on which no reaction liquid or ink is applied, before the surface (upper surface in the example of FIG. 1) of the print medium 101 on which the reaction liquid and the ink are applied.

Heating the lower surface of the print medium 101 before the upper surface can reduce the viscosities of the reaction liquid and the ink while suppressing rapid evaporation of a water content in the reaction liquid and the ink at a higher level than in the case where the upper surface is heated before the lower surface. Specifically, heating the lower surface of the print medium 101 before the upper surface can dry the print medium 101 while suppressing rapid evaporation of the water content in the reaction liquid and the ink at a higher level than in the case where the upper surface is heated before the lower surface. Note that the upper surface of the print medium 101 may be heated before the lower surface as long as the print medium 101 can be dried. As a matter of course, both surfaces of the print medium 101 may be simultaneously heated.

The ink applied to the print medium 101 is preferably heated by the heating mechanism 120 such that the viscosity thereof is reduced to 2 cps or less. More preferably, the print medium 101 is heated such that the viscosity of the ink becomes 1 cps or less.

Heating the print medium 101 by using the heating mechanism 120 can cause the water content to evaporate while causing the solvent with high vapor pressure to permeate into the print medium 101. Heating temperature is preferably 40° C. or higher and 100° C. or lower. More preferably, the print medium 101 is heated at 60° C. or higher and 80° C. or lower. Note that a removal ratio of the liquid components in the reaction liquid and the ink by the heating is preferably 70 mass % or more to suppress occurrence of cockling after the heating.

The removal ratio of the liquid components can be obtained as follows.

The water contents in the reaction liquid and the ink before and after the heating and drying are measured by using an infrared moisture gauge, and the water content removal ratio is calculated from the measured values. Moreover, regarding the amount of the organic solvents in the reaction liquid and the ink before and after the drying, it is possible to measure the contents of the respective organic solvents by subjecting the reaction liquid and the ink collected from the print medium 101 to liquid chromatography and calculate removal ratios of all organic solvents from the measured values. In the present embodiment, the water content removal ratio and the organic solvent removal ratios are added up as a liquid content removal ratio. Note that, in the case where a non-volatile organic solvent with a boiling point far higher than that of water such as glycerin is included, this solvent does not evaporate in heating and drying at 60° C. or higher and 120° C. or lower, and the water content removal ratio of the infrared moisture gauge is thus used as the liquid content removal ratio.

That is the method of obtaining the removal ratio of the liquid content.

In the case where the drying of the reaction liquid and ink applied to the print medium 101 is completed, the print medium 101 is conveyed from the third conveyance mechanism 118 to the paper discharge unit 106.

<Paper Discharge Unit 106>

The print medium 101 conveyed to the paper discharge unit 106 is stacked inside the paper discharge unit 106.

<Control System>

Figure 2:
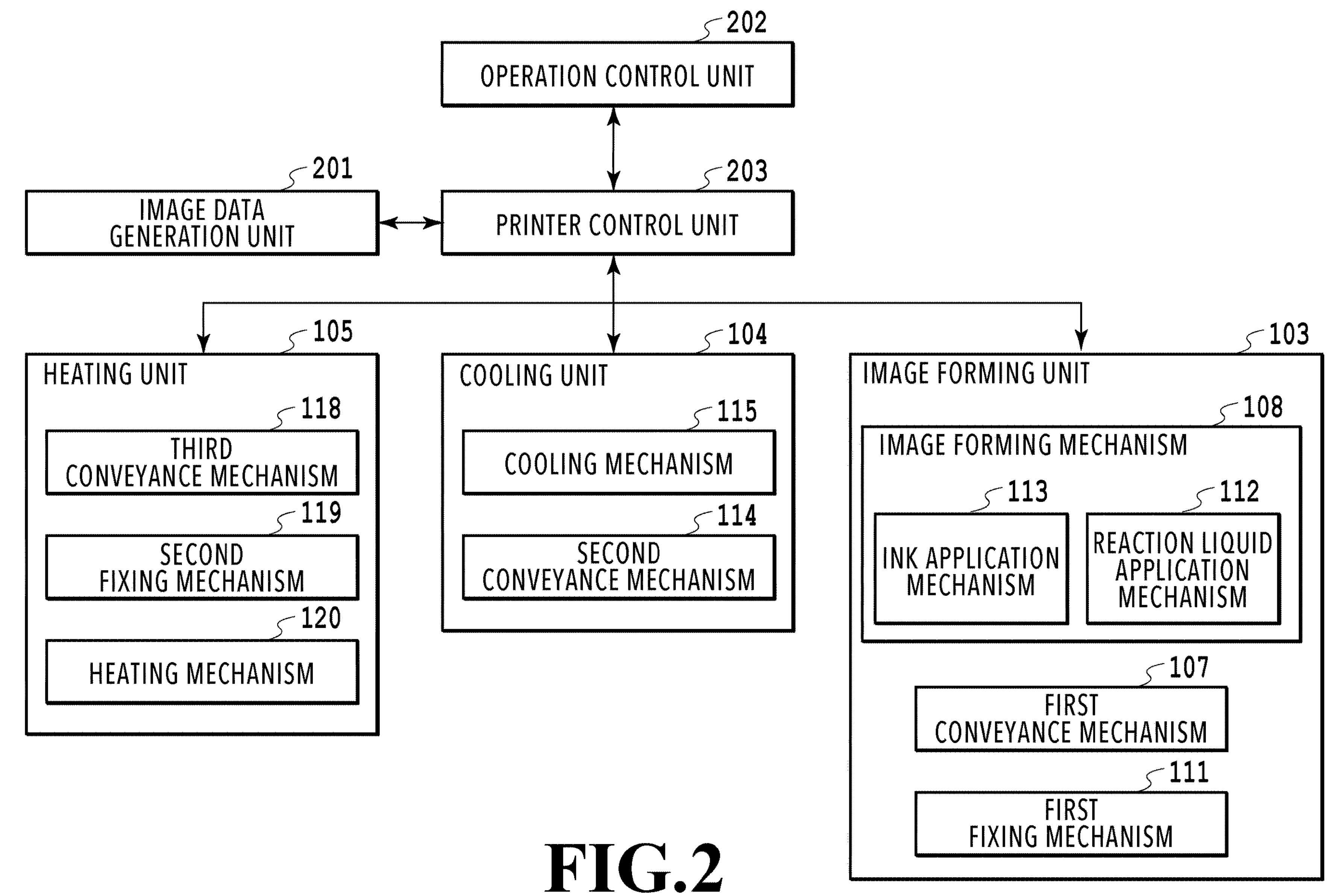
FIG. 2 is a block diagram illustrating a control system of the entire printing apparatus in one embodiment.

FIG. 2 is a block diagram illustrating a control system of the entire apparatus in the printing apparatus 100. The printing apparatus 100 includes a control system configured to control the units illustrated in FIG. 1.

As illustrated in FIG. 2, the printing apparatus 100 includes an image data generation unit 201, an operation control unit 202, and a printer control unit 203 as the control system. The image data generation unit 201, the operation control unit 202, the image forming unit 103, the cooling unit 104, and the heating unit 105 can exchange data with one another via the printer control unit 203.

The image data generation unit 201 receives image data from a print server or the like arranged outside the printing apparatus, and transmits the image data to the printer control unit 203. The operation control unit 202 is configured to include an operation panel and the like (not illustrated) used by the user to input an instruction to the printing apparatus. The instruction inputted into the operation control unit 202 is transmitted to the printer control unit 203. The printer control unit 203 controls each of the image forming unit 103, the cooling unit 104, and the heating unit 105 based on the image data received from the image data generation unit 201 and the instruction inputted into the operation control unit 202, and executes print processing on the print medium.

Figure 3:
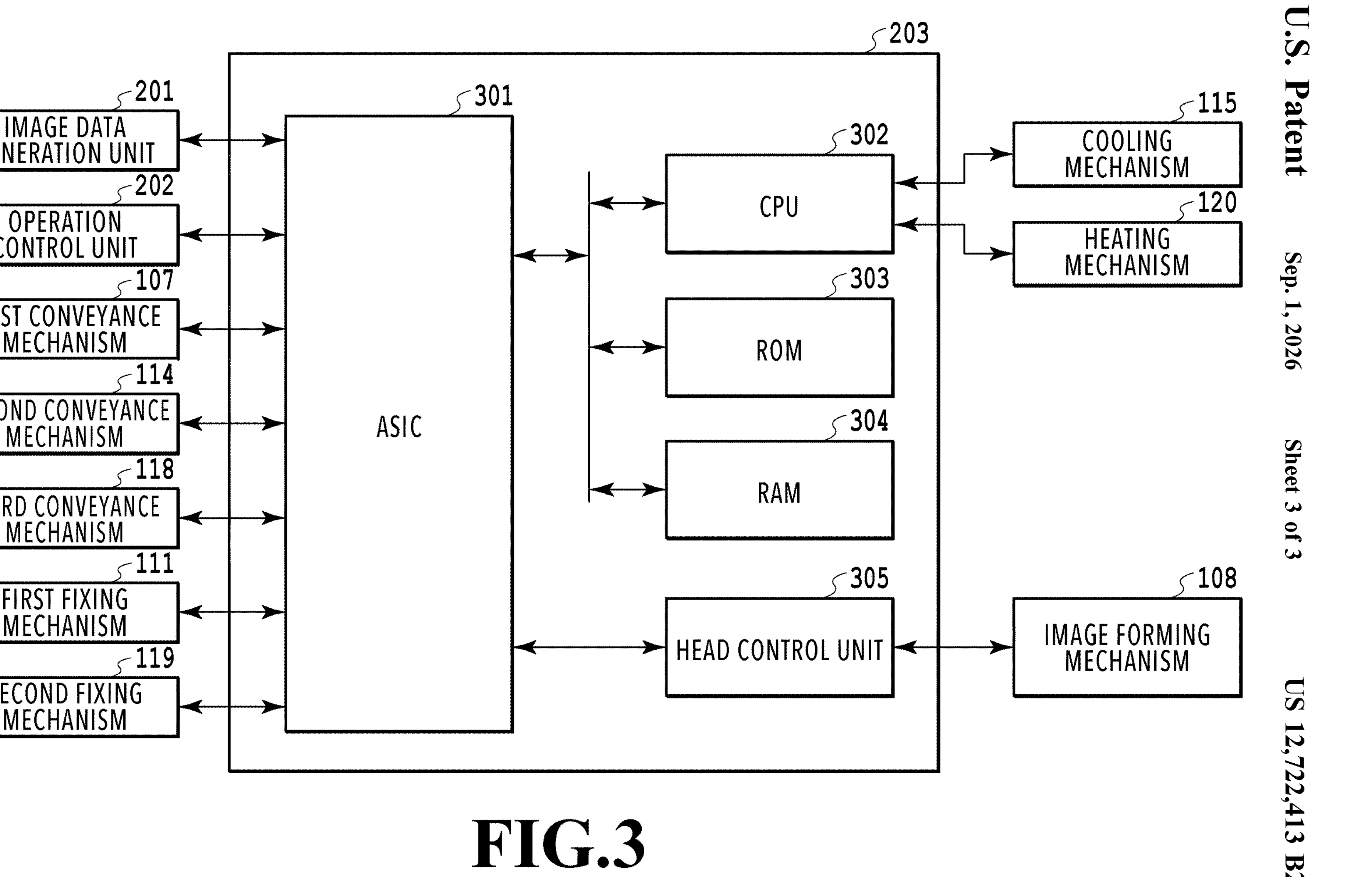
FIG. 3 is a block diagram of a printer control unit in one embodiment.

FIG. 3 is a block diagram of the printer control unit 203 in the present embodiment.

As illustrated in FIG. 3, the printer control unit 203 includes an application specific integrated circuit (ASIC) 301, a CPU 302, a ROM 303, a RAM 304, and a head control unit 305.

The ASIC 301 is connected to the CPU 302, the ROM 303, the RAM 304, and the head control unit 305 via a bus. The ASIC 301 can exchange data necessary for the print processing in the present embodiment with the CPU 302, the ROM 303, the RAM 304, and the head control unit 305 via the bus.

The ASIC 301 is an integrated circuit for specific application. The ASIC 301 in the present embodiment is used to execute the print processing on the print medium. A network controller, a serial IF controller, an image data generation controller, a motor controller, and the like are built in the ASIC 301.

The ASIC 301 can exchange data necessary for execution of the print processing on the print medium with the image data generation unit 201 and the operation control unit 202. Moreover, the ASIC 301 can exchange data necessary for the conveyance of the print medium with each of the first conveyance mechanism 107, the second conveyance mechanism 114, and the third conveyance mechanism 118. Furthermore, the ASIC 301 can exchange data necessary for the fixation of the print medium with the first fixing mechanism 111 and the second fixing mechanism 119.

The CPU 302 integrally controls the entire printing apparatus. The CPU 302 can exchange data necessary for the cooling of the print medium with the cooling mechanism 115. The CPU 302 can exchange data necessary for the heating of the printing medium with the heating mechanism 120. The ROM 303 stores a control program of the CPU 302. The control program stored in the ROM 303 is executed in the RAM 304

The head control unit 305 generates final ejection data that is image data ultimately transmitted to the image forming mechanism 108. The final ejection data can be exchanged between the ASIC 301 and the image forming mechanism 108 via the head control unit 305. Furthermore, the head control unit 305 also performs generation of drive voltage for driving the image forming mechanism 108 and the like.

EXAMPLES

The present disclosure is described below in further detail by using examples and comparative examples. The following examples do not limit the present disclosure at all as long as the examples are within a scope not exceeding the gist of the present disclosure. Note that "parts" in the following description of the examples is based on mass unless otherwise noted.

In the present examples, the printing apparatus 100 illustrated in FIG. 1 was used. The conveyance speed was set to 0.5 m/s. OK Prince High Grade Paper (manufactured by Oji Paper Co., Ltd., basis weight: 104.7 g/m$^2$) was used as the print medium 101 (see FIG. 1). A reaction liquid with the following composition was used as the reaction liquid applied by the reaction liquid application mechanism 112 (see FIG. 1). The application amount of the reaction liquid was 2 g/m$^2$. Note that balance of ion-exchanged water is an amount by which the total of all components forming the reaction liquid becomes 100.0 parts by mass.

| | |
|---|---|
| Glutaric acid | 21.0 parts by mass |
| Potassium hydroxide | 2.0 parts by mass |
| Glycerin | 5.0 parts by mass |
| Surfactant (trade name: MEGAFAC F444, manufactured by DIC Corporation) | 5.0 parts by mass |
| Ion-exchanged water | Balance |

An inkjet head of a type that ejected ink in an on-demand method by using electrothermal conversion elements was used as the ink application mechanism 113. The application amount of the ink was 32 g/m$^2$. Note that the ink was prepared as described below.

<Preparation of Pigment Dispersion>

First, 10 parts of carbon black, 15 parts of resin aqueous solution, and 75 parts of pure water were mixed. A carbon black with a trade name of Monarch 1100 (manufactured by Cabot) was used as the carbon black. An aqueous solution in which a content of a resin (styrene-ethyl acrylate-acrylic acid copolymer, acid value: 150, weight average molecular weight (Mw): 8,000) was 20.0 mass % was neutralized with a potassium hydroxide aqueous solution, and the resultant solution was used as the resin aqueous solution.

Next, this mixture was fed into a batch-type vertical sand mill (manufactured by AIMEX), 200 parts of zirconia beads with a diameter of 0.3 mm were charged, and the mixture was subjected to dispersion processing for five hours while being water-cooled. Thereafter, this dispersion liquid was subjected to centrifugal separation to remove coarse particles, and then a black pigment dispersion with a pigment content of 10.0 mass % was obtained.

<Preparation of Resin Particle Dispersion>

First, 20 parts of ethyl methacrylate, 3 parts of 2,2'-azobis-(2-methylbutyronitrile), and 2 parts of n-hexadecane were mixed and agitated for 0.5 hours.

Next, this mixture was dropped into 75 parts of an 8% aqueous solution of styrene-butyl acrylate-acrylic acid copolymer (acid value: 130 mgKOH/g, weight average molecular weight (Mw): 7,000) and was agitated for 0.5 hours. Next, an ultrasonic wave was applied to the mixture for three hours by using an ultrasonic wave application apparatus.

Next, polymerization reaction was performed for four hours at 80° C. under a nitrogen atmosphere, the mixture was filtered after being cooled to room temperature, and a resin particle dispersion with a resin content of 25.0 mass % was prepared. Note that the content of the resin in the resin particle dispersion can be adjusted by performing delusion or concentration as necessary. The softening point of this resin was 90° C. Note that this softening point was measured according to "determination of minimum film-forming temperature" in JIS K 6828-2. Specifically, the resin particle dispersion was heated in an appropriate temperature gradient, and boundary temperature between a transparent portion where a film was formed and a portion where no film was formed was measured. The minimum film-forming temperature of the resin particle dispersion was measured by using a minimum film-forming temperature instrument (trade name: MFFTB 90, manufactured by Rhopoint Instruments).

<Preparation of Ink>

The resin particle dispersion obtained as described above and the pigment dispersion were mixed with the following components. Note that balance of ion-exchanged water is an amount by which the total of all components forming the ink becomes 100.0 mass %. The solid content ratio in the ink is 10.0 mass %.

| | |
|---|---|
| Pigment | 4.0 mass % |
| Resin particle | 6.0 mass % |
| Glycerin | 7.0 mass % |
| Polyethylene glycol (number average molecular weight (Mn): 1,000) | 1.0 mass % |
| Surfactant (Acetylenol (registered trademark) E100, manufactured by Kawaken Fine Chemicals Co., Ltd.) | 0.5 mass % |

-continued

| | |
|---|---|
| Wax (Hi-Mic-2095 (manufactured by Nippon Seiro Co., Ltd.), microcrystalline wax (melting point: 103° C.)) | 1.0 mass % |
| Ion-exchanged water | balance |

The components were sufficiently agitated and dispersed, and then the mixture was subjected to pressure filtering by using a micro filter (manufactured by Fujifilm Corporation) with a pore size of 3.0 μm to prepare a black ink.

In the heating mechanism 120 (see FIG. 1), a suction fixation device was used to set the surface temperature of the print medium 101 (see FIG. 1) to predetermined temperature. The surface temperature of print medium 101 was measured by using a radiation thermometer (trade name: IT-545, manufactured by Horiba, Ltd.).

A solid image was printed on the entire surface of the print medium 101 of A4 size under the above conditions.

<Evaluation>

Image samples obtained as described above were evaluated by using the following evaluation methods. Evaluation results are illustrated in [Table 1]. In the present evaluation, A to B in the evaluation criteria of the following evaluation items are assumed to be preferable levels, and C is assumed to be an unacceptable level.

<Rubbing Property Evaluation>

In the present examples, the following rubbing test was performed as evaluation of the fastness of the image. A fastness test fabric to which 50 μL of artificial perspiration liquid was applied was wound around an abrading head with a weight of 120 g in a Gakushin-type color fastness rubbing tester, and rubbing test was performed on an image portion for one to ten strokes. "JIS L 0804, alkaline, pH 8.0" was used as the artificial perspiration liquid. "JIS L 0803, standard adjacent fabrics for staining of colour fastness test, model No. 670101" was used as the fastness test fabric. "AB-301 manufactured by Tester Sangyo Co., Ltd." was used as the Gakushin-type color fastness rubbing tester.

First, 50 μL of artificial perspiration liquid (JIS L 0804, alkaline, pH 8.0) was applied to the fastness test fabric (JIS L 0803, standard adjacent fabrics for staining of colour fastness test, model No. 670101). Next, the fastness test fabric was wound around the abrading head with weight of 120 g in the Gakushin-type color fastness rubbing tester (AB-301 manufactured by Tester Sangyo Co., Ltd.), and the rubbing test was performed on an image portion of an image sample for one to ten strokes. Then, a no-image portion and the fastness test fabric after the rubbing test were observed.

A: No adhering of the ink to the test fabric was observed in the rubbing test of one stroke.

B: Slight adhering of the ink to the test fabric and slight adhering of the ink to the no-image portion due to rubbing were observed, but were at ignorable levels.

C: Adhering of the ink to the test fabric and adhering of the ink to the no-image portion due to rubbing were observed at great levels.

<Cockling Property>

Image portions of cockling evaluation samples (solid images on entire surfaces of sheets of A4 size) created in the examples and the comparative examples were visually observed. Evaluation criteria are as follows.

A: No cockle was observed in the image portion.

B: A cockle was observed in the image portion, but was at such a level that the cockle caused no problem in practical use.

C: A cockle was highly visible in the image portion, and was at such a level that the cockle was a problem in practical use.

The combinations illustrated in [Table 1] were studied regarding the blown air temperature in the case where the print medium was conveyed while being cooled, the suction pressure in the case where the print medium was heated while being fixed, and the surface temperature of the print medium in the case where the print medium was heated while being fixed, and evaluation results are illustrated in [Table 1]. Specifically, [Table 1] illustrates the combinations of the blown air temperature of the cooling mechanism 115, the suction pressure of the second fixing mechanism 119, and the surface temperature achieved by the heating mechanism 120 and the evaluation results for these combinations.

Moreover, the temperature of the ink applied by the ink application mechanism 113 in the present examples was 35° C.

TABLE 1

| | Blown air temperature in conveyance (° C.) | Suction pressure in fixation and heating (Pa) | Surface temperature in fixation and heating (° C.) | Rubbing property evaluation | Cockling evaluation |
|---|---|---|---|---|---|
| Example 1 | 30 | −2000 | 80 | A | B |
| Example 2 | 30 | −1000 | 80 | A | B |
| Example 3 | 25 | −2000 | 80 | A | A |
| Example 4 | 30 | −2000 | 60 | B | B |
| Comparative example 1 | 120 | −2000 | 80 | C | B |
| Comparative example 2 | 60 | −2000 | 80 | B | C |
| Comparative example 3 | 30 | −50 | 80 | A | C |
| Comparative example 4 | 30 | −2000 | 30 | C | C |

In the case where printing was performed under the conditions illustrated in Examples 1 to 4, in the cooling and conveyance, the temperature of the reaction liquid and ink applied to the print medium decreased, and the viscosities thereof thereby increased. Accordingly, the liquid component in the ink was less likely to permeate into the print medium in the cooling and conveyance. Particularly, in Example 3, the print medium was cooled at temperature lower than the temperature of the ink by 10° C., and as a result, the cockling evaluation result of Example 3 indicated the best value.

Moreover, heating the print medium in the fixed state in the fixation and heating caused the solvent with high vapor pressure to permeate into the print medium. Accordingly, it was possible to achieve both of suppression of cockling and good fastness of the image. In other words, it was possible to appropriately perform drying of the print medium.

Particularly, in Examples 1 to 3, the print medium was heated at temperature higher than the temperature of the ink by 40° C. or more, and the viscosity of the liquid component in the ink thereby decreased. The decrease in the viscosity of the liquid component in the ink facilitated permeation of the solvent in the ink into the print medium. Accordingly, the rubbing property results of Examples 1 to 3 indicated the best value.

In the case where the heating and drying is performed at high temperature immediately after the application of the reaction liquid and the ink to the print medium as illustrated in Comparative Example 1, the water content rapidly evaporates. In this case, rapid evaporation of the water content causes the non-volatile solvent in the reaction liquid and the ink to remain on the surface of the print medium, and desired fastness cannot be obtained.

In the case where the temperature in the drying is dropped from that in Comparative Example 1 as in Comparative Example 2, the fastness (rubbing property) of the image can be improved from that in Comparative Example 1. However, since the temperature in the drying is higher than the temperature of the reaction liquid and ink applied to the print medium, the viscosity of the liquid component in the ink decreases. Specifically, a decrease in the viscosity of the liquid component in the ink with more ink remaining on the surface than in Comparative Example 1 facilitates permeation of this liquid component into the print medium. As a result, cockling is more likely to occur than in Comparative Example 1.

In the case where the suction pressure in the fixation and heating step is lower than those in the above Examples as in Comparative Example 3, the print medium is not sufficiently fixed in the fixation and heating step, and a flat and smooth surface cannot be maintained. Accordingly, the print medium during the drying is in a deformable state, and cockling tends to occur.

In the case where the heating temperature in the fixation and heating is lower than those in the above Examples as in Comparative Example 4, water content is not sufficiently dried and remains in the print medium after the fixation and heating. Accordingly, cockling tends to occur due to natural drying after the fixation and heating.

From the above results, cooling the reaction liquid and ink applied to the print medium and then heating the print medium while fixing the print medium can achieve both of suppression of cockling and good fastness of the image. In other words, drying of the print medium can be appropriately performed.

As described above, the printing method of the present embodiment includes the application step of applying the ink to the print medium capable of absorbing the ink, the cooling step of cooling the print medium to which the ink is applied, and the heating step of heating the cooled print medium while maintaining the print medium flat and smooth.

If the print medium is dried without the cooling step, there is a possibility that the water content (for example, water) included in the ink evaporates before the solvent included in the ink, and the solvent remains on the surface of the print medium. In other words, in the case where the solvent fails to permeate into the print medium, it is difficult to achieve good fastness of the image.

Moreover, in the case where evaporation of the ink is suppressed by humidification to cause the solvent to permeate into the print medium, there is a possibility that the print medium excessively absorbs moisture and cockling occurs. Moreover, in the case where the print medium is conveyed in a state where the temperature of the ink in the print medium is relatively high, there is a possibility that the ink permeates into the print medium during the conveyance and cockling occurs.

Meanwhile, in the printing method of the present embodiment, the viscosity of the ink is temporarily increased in the cooling step, and the print medium is conveyed from the ink application unit to the heating unit in the state where the permeation of the ink is suppressed.

According to the printing method as described above, since the permeation of the ink during the conveyance of the print medium is suppressed, occurrence of cockling can be suppressed. Moreover, since the print medium is cooled in the period from the application of the ink to the conveyance to the heating unit, loss of the water content in the ink due to evaporation is also suppressed.

Then, the heating unit heats the print medium in the fixed state at temperature lower than the temperature at which the solvent evaporates. Accordingly, the solvent with relatively high vapor pressure can permeate into the print medium. In other words, good fastness of the image can be obtained. In addition, since the ink applied to the print medium is dried with the print medium being in the fixed state, cockling can be also suppressed.

Thus, the print medium can be appropriately dried according to the printing method of the present disclosure.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2023-031059, filed Mar. 1, 2023 and No. 2023-214699, filed Dec. 20, 2023 which are hereby incorporated by reference wherein in their entirety.

What is claimed is:

1. A fixing method of ink to a print medium, comprising:

applying the ink to a first surface of the print medium with a liquid application unit;

cooling the print medium to which the ink is applied in the applying, to a temperature equal to or below a temperature of liquid applied in the applying, by blowing air to the print medium; and heating the print medium cooled in the cooling while maintaining the print medium in a flat and smooth state, wherein the print medium is conveyed in a conveyance direction by a first conveyance unit in the applying, wherein the print medium is conveyed in the conveyance direction by a second conveyance unit in the cooling, the second conveyance unit arranged downstream of the first conveyance unit in the conveyance direction, and wherein the print medium is conveyed in the conveyance direction by a third conveyance unit in the heating, the third conveyance unit arranged downstream of the second conveyance unit in the conveyance direction.

2. The fixing method according to claim 1, wherein the ink includes water and an organic solvent whose boiling point is above 100° C.

3. The fixing method according to claim 2, wherein the ink further includes a resin capable of improving a characteristic of an image formed on the print medium.

4. The fixing method according to claim 1, wherein the third conveyance unit includes a belt, and conveys the print medium by rotating the belt, and the third conveyance unit includes a suction unit, and maintains the print medium in the flat and smooth state in the heating by sucking the print medium on the belt with the suction unit.

5. The fixing method according to claim 4, wherein the suction unit maintains the print medium in the flat and smooth state by sucking a second surface being a back side of the first surface of the print medium.

6. The fixing method according to claim 1, wherein, in the applying, the ink is applied after application of a reaction liquid configured to react with a component of the ink.

7. The fixing method according to claim 1, wherein, in the applying, a reaction liquid configured to react with a component of the ink is applied after the application of the ink.

8. The fixing method according to claim 1, wherein, in the cooling, the first surface of the print medium is cooled before a second surface being a back side of the first surface.

9. The fixing method according to claim 1, wherein, in the cooling, a cooling unit blows air with a temperature below a temperature of the ink applied in the applying, to the print medium.

10. The fixing method according to claim 1, wherein a viscosity of the ink applied to be print medium becomes 5 cps or more in the cooling.

11. The fixing method according to claim 1, wherein, in the heating, a second surface being a back side of the first surface of the print medium is heated before the first surface.

12. The fixing method according to claim 1, wherein a viscosity of the ink applied to the first surface of the print medium becomes 1 cps or less in the heating.

13. The fixing method according to claim 1, wherein the liquid application unit applies a liquid of one color or liquids of a plurality of colors to the print medium.

14. A printing apparatus configured to fix ink to a print medium, comprising:

an application unit configured to apply the ink to a first surface of the print medium;

a cooling unit configured to cool the print medium to which the ink is applied, to a temperature equal to or below a temperature of liquid applied by the application unit, by blowing air to the print medium; and a heating unit configured to heat the print medium cooled by the cooling unit while maintaining the print medium in a flat and smooth state, wherein the printing apparatus is configured so that:

the print medium is conveyed in a conveyance direction by a first conveyance unit in applying of the ink by the application unit;

the print medium is conveyed in the conveyance direction by a second conveyance unit in cooling by the cooling unit, the second conveyance unit arranged downstream of the first conveyance unit in the conveyance direction; and the print medium is conveyed in the conveyance direction by a third conveyance unit in heating by the heating unit, the third conveyance unit arranged downstream of the second conveyance unit in the conveyance direction.

* * * * *